June 23, 1964

C. F. WALLACE ETAL 3,138,795

ELECTRONIC AUDIBLE HORN

Filed Aug. 7, 1959

INVENTORS
CHARLES F. WALLACE
NORMAN S. CRESWICK
BY BILL GENE WATTERS

Lester N. Clark

ATTORNEY

June 23, 1964 C. F. WALLACE ETAL 3,138,795
ELECTRONIC AUDIBLE HORN

Filed Aug. 7, 1959 4 Sheets-Sheet 2

INVENTORS
CHARLES F. WALLACE
NORMAN S. CRESWICK
BY BILL GENE WATTERS

Lester N. Clark

ATTORNEY

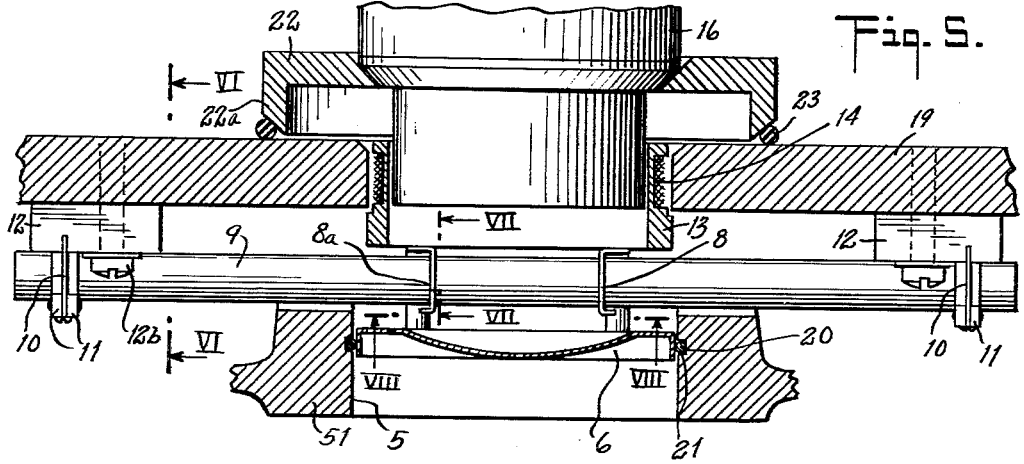
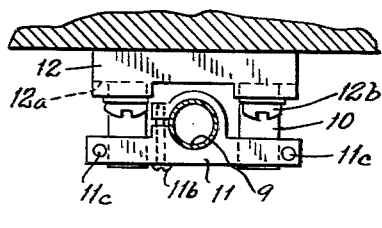
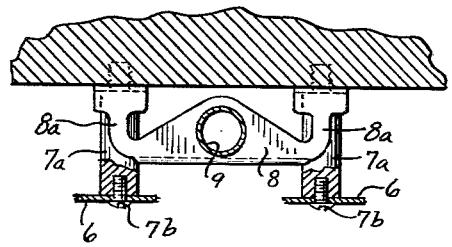
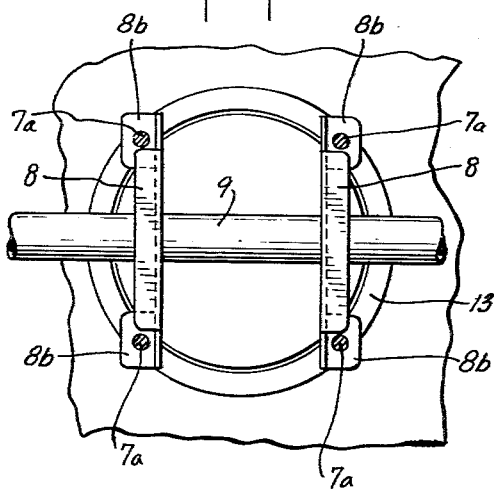
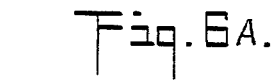
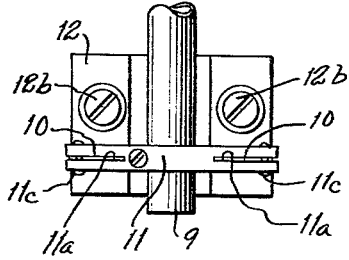

June 23, 1964 C. F. WALLACE ETAL 3,138,795
ELECTRONIC AUDIBLE HORN
Filed Aug. 7, 1959 4 Sheets-Sheet 4
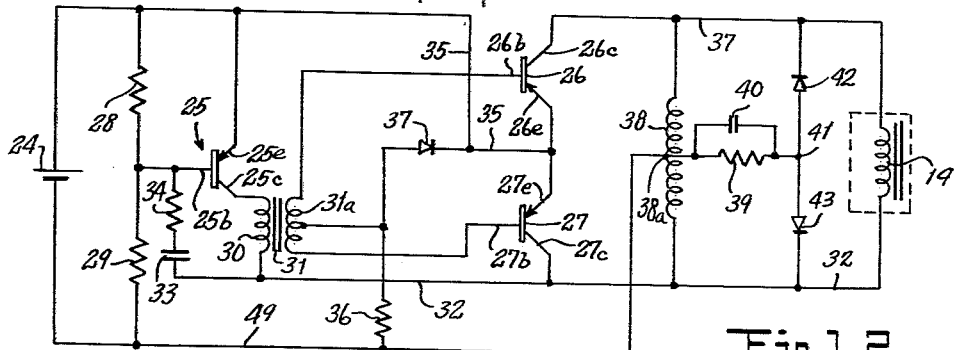
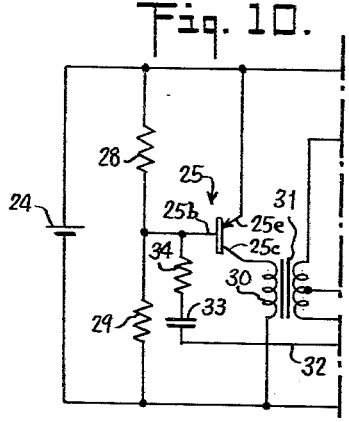
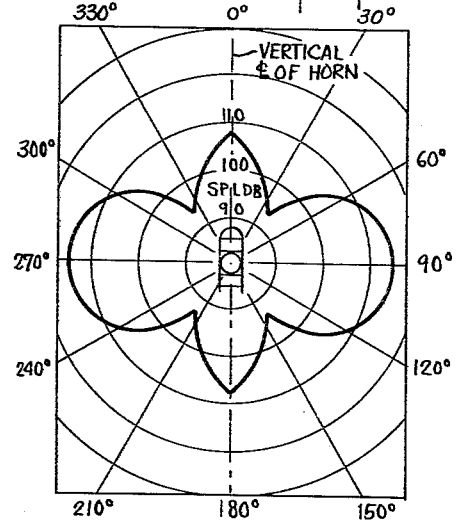
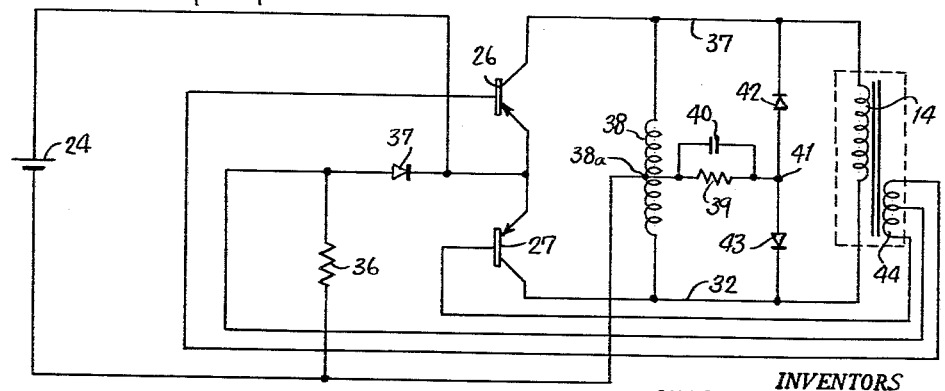
INVENTORS
CHARLES F. WALLACE
NORMAN S. CRESWICK
BY BILL GENE WATTERS
*Lester N. Clark*
ATTORNEY

United States Patent Office 3,138,795
Patented June 23, 1964

3,138,795
ELECTRONIC AUDIBLE HORN
Charles F. Wallace, Westfield, and Norman S. Creswick, Middletown, N.J., and Bill Gene Watters, Nahant, Mass., assignors to Wallace & Tiernan Incorporated, Belleville, N.J., a corporation of Delaware
Filed Aug. 7, 1959, Ser. No. 832,284
12 Claims. (Cl. 340—384)

This invention relates to audible signal apparatus and particularly to apparatus suitable for use as a fog horn in a location which is exposed to the weather and where the apparatus may be unattended for long periods of time.

There has recently arisen a demand for fog horns which will operate without attention for a period of months and which will meet high standards of reliability.

Since the horns are sometimes mounted in locations where they are subject to spray and even to occasional immersion under high wave conditions, it is required that the horn structure be capable of withstanding such waves and spray without substantial adverse effect on the operation of the horn. It is desired to run these horns for months without any maintenance work, and it is customary to operate each one under the control of a motor-driven time switch, so that it operates day and night in clear weather or in fog. For example, a typical horn may run on a cycle of two seconds of sound followed by eighteen seconds of silence.

Each horn must have its own source of energy, commonly storage batteries. In order to insure that the battery life is as long as possible, the components of the horn must be made highly efficient.

Such a horn is commonly operated by a driver or transducer energized by an oscillator. In order to secure high effective efficiency, the horn must be constructed so that the sound spreads to a maximum distance in the horizontal plane, without substantial waste of energy in directing the sound vertically. The driver or transducer which vibrates the column of air in the horn and the oscillator which supplies the driver should also be highly efficient.

An object of the present invention is to provide an improved audible signal apparatus including a horn, a driver or transducer for vibrating a column of air in the horn, and an oscillator for energizing the driver.

A further object is to provide an apparatus of the type described in which the components operate at a fixed frequency and without maintenance for long periods of time.

A further object is to provide apparatus of the type described which may be mounted in a location exposed to marine atmosphere, spray and waves, without being adversely affected.

Another object is to provide apparatus of the type described which may operate from a storage battery supply over a period of several months, without substantial changes in the operating frequency because of changes in the battery voltage with age and temperature.

The foregoing and other objects of the invention are attained in the apparatus described herein. This apparatus includes a double horn located in a vertically extending, generally cylindrical housing. The horn has two vertically spaced mouths opening at the periphery of the housing and having equal vertical dimensions. The mouths open horizontally and extend around the entire periphery of the housing. The horn includes a single throat, a first horn portion, at least part of which is tapered, extending between the throat and a fork, and second and third tapered horn portions extending respectively between the fork and the upper and lower mouths.

The fork is located midway between the mouths and substantially along the axis of the housing. The second and third tapered portions of the horn extend respectively upwardly and downwardly from the fork and curve so that they are tangent with the horizontal at the respective mouths. The throat is located within the casing at one side thereof and between the second tapered portion and the upper mouth. The first portion of the horn extends horizontally from the fork and curves generally upwardly to the throat, crossing the upper end portion of the horn. A constant diameter tube has one end opening into the throat and extends therefrom to the upper end portion of the housing. The driver or transducer for vibrating the air in the horn is mounted within the upper end portion of the housing, at one end of a resonating chamber whose opposite end opens into the upper end of the constant diameter tube. The oscillator which energizes the driver is also mounted in that portion of the housing.

The horn portion connected to the upper mouth curves downwardly and inwardly from that mouth, so that any water or spray entering the upper mouth flows downwardly into the horn. The horn portion connected to the lower mouth curves inwardly and upwardly from that mouth and communicates with the horn portion leading to the upper mouth at the fork in the center of the housing. By virtue of this arrangement any water or spray entering either mouth flows downwardly through the horn portions and out through the lower mouth. Since the portion of the horn between the throat and the fork curves upwardly from the fork, any water or spray entering that portion of the horn drains down into the fork and thence out through the lower mouth.

For maximum overall efficiency, it is desirable to have the acoustic impedance of the horn non-reactive, i.e., resistive at the operating frequency. A non-resonant horn would require an overall diameter somewhat larger than a wave length. For the selected frequency of 400 cycles per second, the wave length is approximately one meter. In order to utilize a somewhat smaller structure while retaining substantially non-reactive characteristics for the horn, the sound reflecting condition at the horn mouth due to its small dimensions is balanced by providing a resonating chamber between the throat and the driver.

The driver comprises a piston moving in a cylinder which forms a part of the resonating chamber. A fluid seal is provided between the piston and the cylinder in the form of a rubber O-ring retained in a groove in either the piston or the cylinder. As is customary with such rings, the rubber is maintained under slight compression. The groove in which the ring is mounted is made somewhat wider than the ring, so that the ring can roll in the groove during vibration of the piston, rather than sliding on the piston or the cylinder.

The piston is mounted on the central portion of an elongated beam. An energizing coil is also mounted on the same central portion of the beam, so that the central portion with the coil and piston vibrate together. It is preferred to use a stiff steel tube for the beam. The ends of the beam are supported on stiff leaf springs, whose plane is transverse to the beam axis. The beam axis is preferably horizontal and the plane of the leaf springs vertical. The leaf springs serve as frictionless pivots for the ends of the beam during vibration of its central portion. The beam, coil and piston assembly is designed to be mechanically resonant at the desired fixed frequency of the apparatus.

The driver also comprises a magnetic circuit including a permanent magnet and an air gap for receiving the coil.

The coil is connected in the output circuit of an oscillator supplied with energy from a storage battery. The oscillator includes two transistors connected in push-pull. A feedback coil may be mounted on the magnetic circuit with the driver coil, and may be connected to the input of the oscillator. Alternatively, the feedback may be conductively coupled through a pre-amplifier stage and a transformer to the input of the push-pull stage. It is preferred to use a pre-amplifier and to secure the feedback necessary for oscillation partly through the pre-amplifier and partly through a direct feedback into the input of the push-pull stage, so that both stages cooperate in both the amplifying and oscillating functions.

Other objects and advantages of the invention will become apparent from a consideration of the following specification and claims, taken together with the accompanying drawings.

In the drawings:

FIG. 5 is a fragmentary detailed sectional view, similar to a portion of FIG. 4;

FIG. 6 is a sectional view, taken on the line VI—VI of FIG. 5;

FIG. 6A is a bottom view of the structure shown in FIG. 6;

FIG. 7 is a sectional view, taken on the line VII—VII of FIG. 5;

FIG. 8 is a view taken on the line VIII—VIII of FIG. 5;

FIG. 9 is a wiring diagram of an oscillator circuit embodying certain features of the invention;

FIG. 10 is a fragmentary wiring diagram showing a modification of the circuit of FIG. 9;

FIG. 11 is a wiring diagram showing another modified form of oscillator circuit; and FIG. 12 is a graphical illustration, taken on a vertical plane through the fog horn, showing the pattern of distribution of sound from the fog horn.

The Horn

Figure 1:
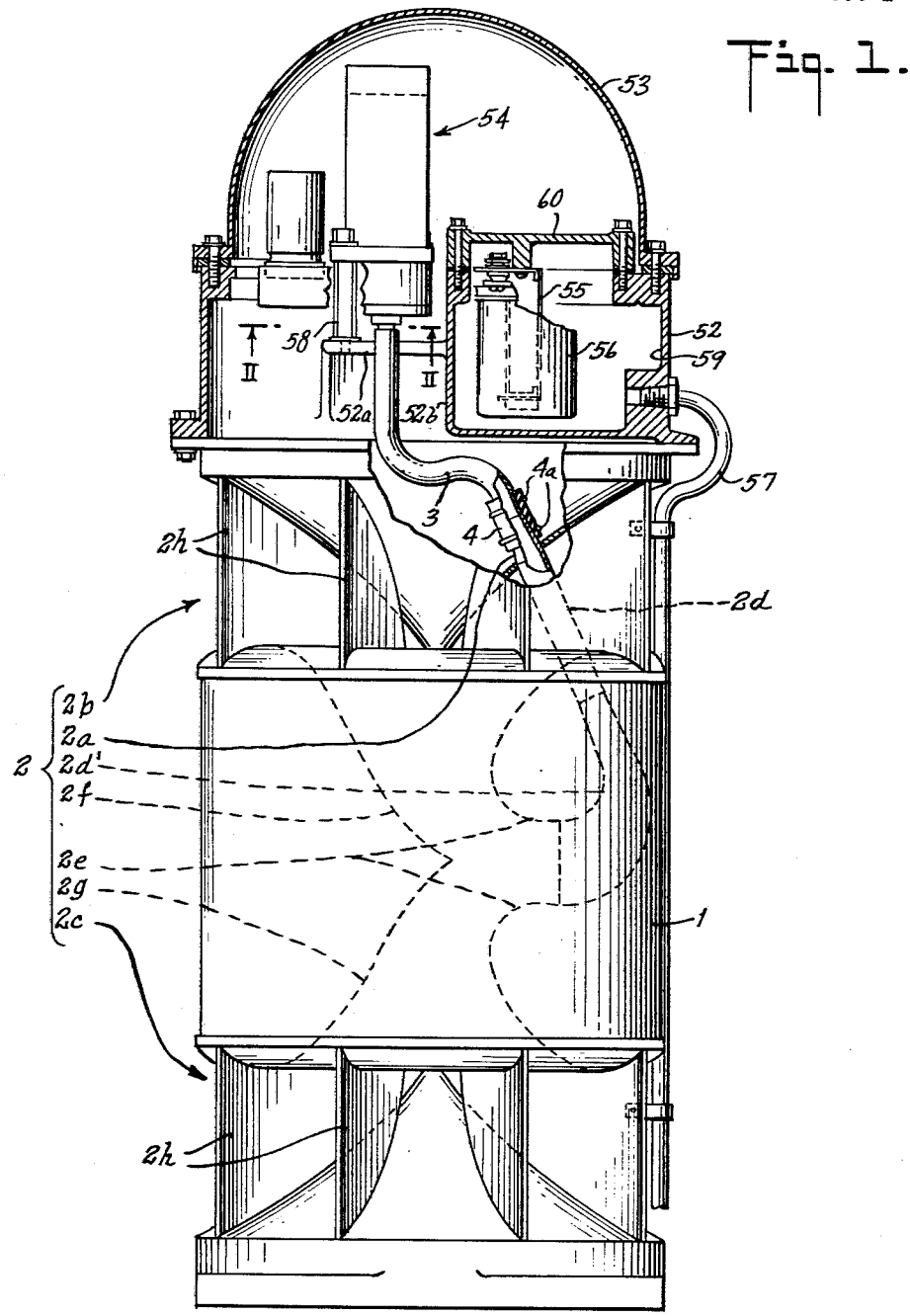
FIG. 1 is a view, partly in elevation and partly in section, showing a fog horn embodying the invention.
Figure 2:
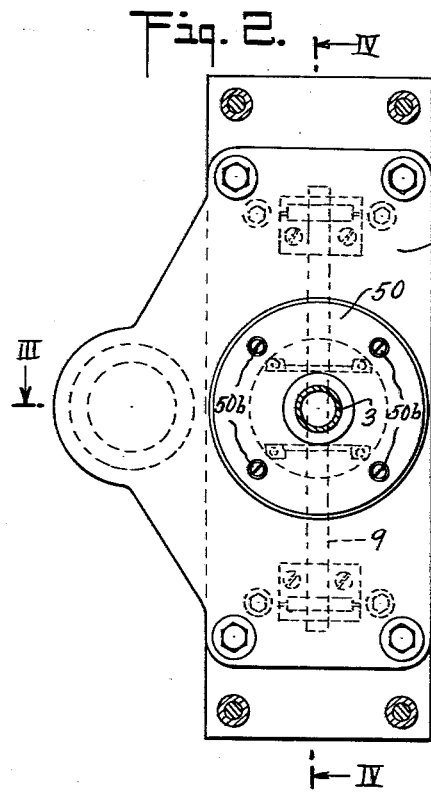
FIG. 2 is a sectional view, taken on the line II—II of FIG. 1, looking in the direction of the arrows.
Figure 4:
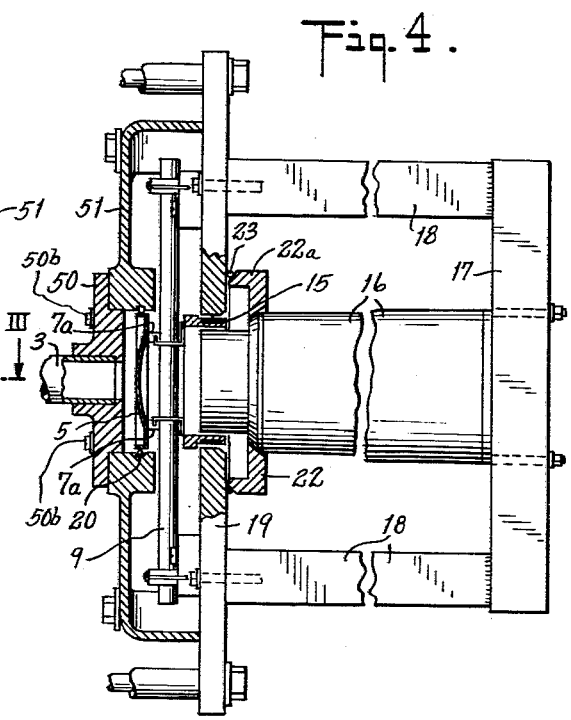
FIG. 4 is a view, partly in section, on the line IV—IV of FIG. 2, and partly in elevation.
Figure 3:
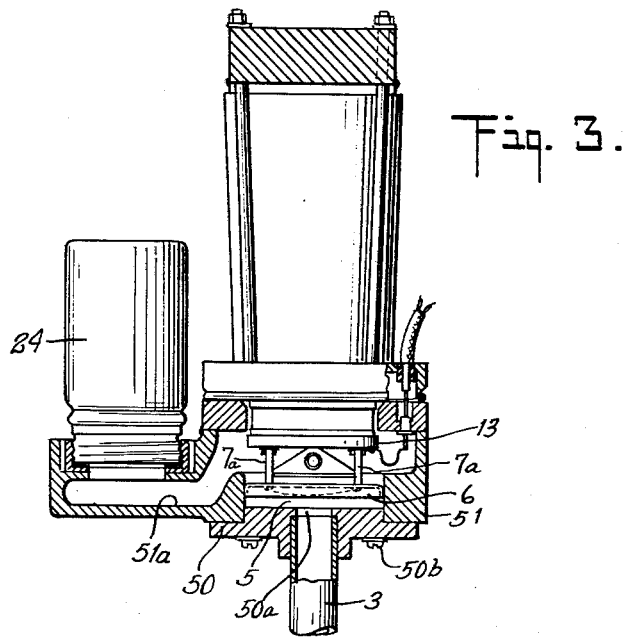
FIG. 3 is a sectional view taken on the line III—III of FIG. 2, looking in the direction of the arrows.

There is shown in FIG. 1 a fog horn including a generally cylindrical housing 1 having its axis vertical and adapted for mounting on a horizontal plane support. Within the housing 1 there is located a double exponential horn, generally indicated by the reference numeral 2, which tapers from a throat 2a to a large end which includes an upper mouth 2b and a lower mouth 2c vertically spaced from the upper mouth. The horn may be described as a vertical linear array of two in-phase sources of sound. The mouths extend around the entire periphery of the housing and each mouth is sectionalized by a plurality of radial vanes 2h. A constant diameter portion 2d' leads from the throat 2a to a tapered portion 2d, which extends to a fork 2e. From the fork 2e, a second tapered portion 2f extends upwardly to the mouth 2b, and a third tapered portion 2g extends downwardly to the mouth 2c. The tapered portion 2f curves downwardly and inwardly from the mouth 2b to the fork 2e. The tapered portion 2g similarly curves inwardly and upwardly from the mouth 2c to the fork 2e. The tapered portions 2f and 2g together form a drain passage for any water or moisture which may enter through either of the mouths 2b and 2c. The drain passage allows all such water to flow down and out through the lower mouth 2c. The tapered portion 2d' curves downwardly from the portion 2d and extends susbtantially horizontally into the fork 2e. Any moisture which may get into the portions 2d and 2d' is drained downwardly through them and into the fork 2e where it may readily pass through the tapered portion 2g to the mouth 2c.

A constant diameter tube 3 has a gooseneck portion extending from the throat 2a and a vertical portion at the other end of the gooseneck. The upper end of the tube 3 abuts against one side of an orifice 50a formed in an orifice plate 50 mounted by means of screws 50b on the under side of a driver cover 51. The tube 3 has a sliding fit in the plate 50. In the cover 51 is formed a cylindrical aperture which receives a central projection on the plate 50 and also receives a piston 6. The piston 6, cover 51 and plate 50 define a cylindrical resonating chamber indicated by the reference numeral 5.

The lower end of tube 3 abuts against the upper end of the tapered throat 2a, as best seen in FIG. 1. The tube 3 and throat 2a are held together by a rubber hose coupling 4, held in place by coil spring clips 4a.

The fog horn illustrated is designed to operate at 400 cycles. For maximum overall efficiency of the driver and horn combination, the mechanical load or impedance imposed upon the driver by the horn means, which includes the horn 2, the tube 3, and the coupling chamber 5, should be non-reactive. Further, the magnitude of the mechanical impedance should be such that the over-all efficiency of the fog horn is as high as possible, consistent with the maximum allowable deflection of the driver. The mechanical impedance can be adjusted so as to be non-reactive and to have the desired magnitude by adjusting the length of the constant diameter tube 3, the length of the larger resonating chamber 5, and the diameter of the throat 2a and tube 3. These elements constitute the parameters of an impedance matching network and may be adjusted to give the aforementioned maximum efficiency consistent with the allowable driver deflection.

All the elements of the horn from the throat 2a back to the piston may be regarded as an acoustic coupling device whose dimensions and characteristics may be designed to suit the needs of each particular embodiment of the invention.

The diameter of the horn portion 2d which crosses the upper tapered portion 2f of the horn is so small as compared to the wave length of the sound that it makes no substantial difference in the distribution pattern.

The various lengths involved must be selected to place the surface of the piston at a peak of the standing wave which is set up between the piston and the mouth of the horn. If the piston is so placed, the mechanical load on it is resistive (nonreactive). If the piston is placed at any point other than a peak or a null of the standing wave, the load on the piston is then reactive rather than resistive. A peak is selected for the piston position rather than a null since the peak position requires less piston movement to produce a given sound intensity level at a given distance outside the horn mouth. A null point of the wave always occurs at the horn mouth. Other nulls appear at every half wave length back from the mouth. The various lengths may be adjusted as necessary to place the piston at a peak.

On the top of the horn 2 is mounted a cylindrical casing 52, covered by a dome 53. The casing 52 and dome 53 enclose a driver, generally indicated in FIG. 1 by the reference numeral 54, an oscillator, generally indicated by the reference numeral 55, and a timer 56. Power is supplied to the unit from an external battery through a conduit 57.

The horn 2, casing 52, and dome 53 are preferably molded of glass reinforced plastic material, which is highly resistant to corrosion by marine atmosphere.

Driver 54 is supported on studs 58, threaded on a fixed platform 52a molded in the casing 52. A chamber 59 is formed by walls 52b, molded in the casing 52, and a cover 60 which sealingly encloses the chamber against entrance of moisture. The timer 56 and the oscillator 55 are located in the sealed chamber 59.

The timer 56 is a continuously running motor-driven switch, preferably adjustable to select any desired program over a range, for example, from two seconds of sound in six minutes to continuous sound.

The frequency of the audible signal changes to some extent with atmospheric conditions because of inherent loading effects, i.e., changes in the mechanical load on the horn. Since the horn is balanced to be substantially non-reactive, however, its characteristics are not substantially modified by such load variations. Consequently, the mechanical resonant frequency of the driver is the determining factor in the frequency of the sound. It has been found that atmospheric conditions may change the frequency of the note by not more than plus or minus 4%.

The Driver

The mechanism which supports the piston 6 and vibrates it at 400 cycles is hereinafter referred to as the driver, and is best illustrated in FIGS. 2-8. The piston 6 is mounted by means of four spacer studs 7a and screws 7b on the bottom of a spool 13 which supports a driver coil 14. A pair of horizontally extending yokes 8 have at their ends upstanding legs 8a with top flanges 8b apertured to receive the spacer studs 7a and to be held thereby against the bottom of the spool 13. The yokes 8 have central apertures to receive a beam 9, preferably in the form of a cylindrical tube, which projects a substantial distance in both directions beyond the yokes. The beam 9 is supported at its ends. The support at one end is illustrated in FIGS. 6 and 6A and includes two stiff leaf spring members 10 having their lower ends received in slots 11a formed in the ends of a clamp block 11, which is clamped on the end of beam 9 by means of a screw 11b. The ends of the slots are closed by rivets 11c to hold the springs 10 firmly in place. The upper ends of the springs 10 are received and soldered in place in slots 12a formed in a block 12, mounted by screws 12b on a magnetic yoke member 19.

The spools 13 and coil 14 are mounted in an air gap 15 formed in a magnetic circuit including a central permanent magnet pole piece 16 and magnetic yoke members 17, 18 and 19 which complete the circuit between the ends of the pole piece 16. The air gap 15 is between one end of the pole piece 16 and a concentric aperture formed in the yoke member 19.

The driver assembly, including the beam 9 and its spring supports 10, and the parts mounted at the middle of the beam 9, including principally the piston 6, the spool 13 and coil 14, are designed so that their natural frequency of vibration is the frequency of the note desired from the horn. In the embodiment illustrated, this frequency is 400 cycles. The spring supports 10 serve as frictionless pivots for the ends of beam 9, and its center vibrates vertically. The peak-to-peak amplitude of vibration, in various physical embodiments of the invention, has ranged from 0.020 to 0.080 inch. This vibration is accomplished by supplying the coil 14 with square wave electrical energy at 400 cycles frequency.

An O-ring seal 20 (see FIG. 5) is provided between the piston 6 and the cylindrical wall of the chamber 5. The wall of the chamber 5 is provided with a groove 21 for receiving the O-ring. The vertical dimension of the groove, as it appears in the drawing, is made slightly greater than the diameter of the O-ring. The difference between the groove width and the O-ring diameter should be slightly more than the amplitude of vibration of the beam 9. By virtue of the spacing of the O-ring, it rolls back and forth during vibration of the piston, so that there is no sliding friction either between the piston and the O-ring or between the O-ring and the wall. This rolling seal allows the piston to vibrate freely at the natural frequency of the vibrating assembly, without substantial damping due to frictional load.

A non-magnetic plate 22 encircles the pole piece 16 near the air gap 15 and has a flange 22a projecting toward the yoke member 19. An O-ring 23 seals the gap between the flange 22a and the yoke member 19. The plate 22a and O-ring 23 serve to prevent passage of moisture into the vibrating assembly. The space around the vibrating assembly is connected through a passage 51a in the cover 51 to the interior of a container 24 which may be filled with a suitable desiccant, e.g., silica gel, for the purpose of maintaining the atmosphere at the vibrating assembly in a completely dry condition.

Fig. 9—The Oscillator

A presently preferred form of oscillator circuit for supplying electrical energy to the coil 14 is illustrated in FIG. 9. This circuit is supplied with energy from a battery 24 and includes a preliminary stage comprising a single transistor 25 and a push-pull output stage including transistors 26 and 27.

A voltage divider including resistors 28 and 29 in series is connected across the terminals of battery 24. Transistor 25, which may be of the PNP junction type, has an emitter 25e connected to the positive terminal of battery 24, and a base 25b connected to the common junction of the resistors 28 and 29. Transistor 25 has a collector 25c connected through the primary winding 30 of a transformer 31 to an output line 32. A capacitor 33 and a resistor 34 are connected in series between output line 32 and base 25b.

In the push-pull stage, the emitters 26e and 27e are connected together and to a wire 35 leading to the positive terminal of battery 24. The bases 26b and 27b are connected to the opposite terminals of a secondary winding 31a on the transformer 31. Secondary winding 31a has a center tap connected through a resistor 36 to the negative terminal of battery 24 and through a diode 37 to wire 35, and thence to the positive terminal of battery 24.

Collectors 26c and 27c are connected respectively to an output line 37 and the output line 32. These output lines are connected to the opposite terminals of the driver coil 14.

An inductor 38 has its terminals connected to the output lines 37 and 32 and also has a center tap 38a connected to the negative terminal of battery 24. Inductor 38 acts as an auto-transformer and is hereinafter referred to by that name.

A spike suppressing network is connected to the output lines 32 and 37 and includes a resistor 39 and a parallel capacitor 40 connected between center tap 38a and a junction 41 between two oppositely poled diodes 42 and 43. Junction 41 is connected to the anodes of the diodes, and their cathodes are respectively connected to the output lines 37 and 32.

The following table gives values for the battery and the various resistors and capacitors which have been used in one commercial embodiment of the invention:

| | | |
|---|---|---|
| Battery 24 | volts | 12 |
| Resistor 28 | ohms | 330 |
| Resistor 29 | do | 100,000 |
| Capacitor 33 | mfd | 2.0 |
| Resistor 34 | ohms | 400 |
| Resistor 36 | do | 1000 |
| Resistor 39 | do | 300 |
| Capacitor 40 | mfd | 50 |

Operation of Fig. 9

When the circuit is first energized, the diode 37 is reversely biased by the battery 24, so that substantially the full battery potential appears between the emitters and the collectors and also between the emitters and the bases in the push-pull circuit. One of the transistors necessarily has a slightly lower impedance than the other, and a surge of current will take place through that transistor. The currents in the two base circuits have opposite magnetic effects in the secondary winding 31a, so that the stronger base current predominates and turns one of the transistors on, while blocking the other one from conduction. The transistor which becomes conductive passes a gradually increasing current through one-half of the auto-transformer 38. This current increases at a substantially constant rate and is accompanied by a feedback current flowing through the feedback transformer 31, which feedback current is similarly changing at a constant rate. The current in auto-transformer 38, increasing at a substantially constant rate, produces across the terminals of the auto-transformer 38 a substantially flat-topped output voltage wave. When the oscillator is unloaded or has a non-resonant load, the increase in the transistor current is terminated due either to saturation of the transistor, of the transformer core 31, or of the auto-transformer 38. When the current stops increasing through the auto-transformer 38, the feedback current through winding 30 of transformer 31 also stops increasing, and the direction of change of the magnetic flux in the core 31 reverses, thereby applying between the bases and emitters of the transistors in the push-pull stage a potential tending to turn off the transistor which has been on and to turn on the transistor which has been off. The action is rapidly cumulative, so that the flat-topped output voltage wave has square ends. The sequence of events just described is then repeated with the other transistor on, and continues cyclically. There is thus applied to the terminals of coil 14 alternating potential which is substantially a square wave. This alternating potential consists of a series of half-waves of alternate polarity, each of which is terminated by the occurrence of the saturation effect described above.

Consider now the effect of the load due to the coil 14. The effective load impedance of coil 14 may be analyzed as having two components, namely a constant component due to the resistance of coil 14 and its inductance when the coil is stationary, and a variable component (principally the counter electromotive force) due to the motion of the coil in the field of the permanent magnet. The variable component is substantially zero at those instants when the coil is reversing its motion at the ends of its path of travel. The total effective load impedance is hence a maximum at the middle of the path of coil travel, and a minimum at each end. Hence, the current flow through the coil 14 reaches its maximum values at those instants when the coil is at the ends of its travel. The circuit parameters are chosen so that when the current in coil 14 reaches those maximum values the saturation effect described above is attained. If the mechanical resonant frequency of the driver 54 is selected to be higher than the resonant frequency of the oscillator, then the saturation effects will occur at the intervals determined by the driver frequency. The current reversals follow instantaneously upon the occurrence of the saturation effects. Consequently, the frequency of the square wave voltage applied to coil 14 is determined by the resonant frequency of the coil 14 and the parts mechanically connected thereto, provided that frequency is higher than the resonant frequency of the oscillator when unloaded.

After the initiation of oscillation, the diode 37 becomes a low impedance to the currents induced in secondary winding 31a, and then has substantially no effect in the circuit.

The emitter-collector path of the transistor 25 in the preliminary or pre-amplifier stage is supplied with power from battery 24 through a circuit which may be traced from the positive terminal of battery 24 through the emitter-collector path of transistor 25, primary winding 30, wire 32, the lower half of auto-transformer 38, center tap 38a, and wire 49 to the negative terminal of battery 24. Hence a portion of the output signal is fed back through primary winding 30 and secondary winding 31a, without being amplified. A second feedback path is provided through capacitor 33 and resistor 34 to base 25b. The signal passing through this second feedback path is amplified by transistor 25 and combined with the unamplified feedback to drive the output stage.

The oscillator perform three functions: (1) as an inverter, producing alternating output from a direct input; (2) as a voltage amplifier, it provides an output potential having an amplitude twice the potential of the D.C. supply; and (3) it serves as a frequency controlled current amplifier.

The inversion and voltage amplification are accomplished in the push-pull stage, where each transistor is connected in series with the battery and one-half of the auto-transformer 38, so that the effective voltage developed across the auto-transformer and hence across the load is approximately twice the potential of battery 24.

The path through capacitor 33 and resistor 34 is of substantially lower impedance to rapid current changes than the path through winding 30. The base potential therefore follows the changes at wire 32 rapidly. Consequently, two advantages are gained by this circuit. First, the maximum value of the signal at the winding 30 is greater than if it were not amplified by transistor 25. Second, the rise time to that maximum is shorter than it would be if the feedback were direct through the winding 30 only.

The various constants in the circuit should be selected so that the natural frequency of electrical oscillation of the circuit with a resistive load is a major fraction (ideally one-half) of the natural frequency of the mechanical oscillation of the vibrating parts of the driver. If the frequencies are so selected, then each of the current maxima in the coil 14, which occur when the coil 14 and is associated parts are at the ends of their travel, is effective to terminate one half-cycle of the electrical oscillation. In effect, the higher mechanical frequency will dominate the lower natural frequency of the oscillator circuit, and the circuit will oscillate at the frequency determined mechanically by the natural frequency of the driver.

Note that the preliminary stage transistor 25 supplies a part of the power to control the output stage. The wave fronts at the load are thereby established by the preliminary stage, the push-pull stage being forced to follow the preliminary stage.

The use of a square wave oscillator enables more efficient use of the magnetic parts of the circuit, since they are operated at high magnetic densities for a substantially greater portion of the time. The transistors are also used more efficiently, since they operate as switches instead of carrying sinusoidally modulated currents. Although it might seem undesirable at first glance to couple a square wave oscillator with a driver whose natural mode of operation is essentially sinusoidal, the gain in efficiency in the magnetic parts of the system and in the transistor by the use of a square wave oscillator more than offsets any loss in efficiency due to a mismatching of the square wave mode of operation of the oscillator and the sinusoidal mode of oscillation of the driver.

*FIG. 10*

This figure illustrates a modification of the circuit of FIG. 9. In this modification, the collector 25c of transistor 25 is connected through primary winding 30 to the negative terminal of the battery 24. The power output line 32 is connected through capacitor 33 and resistor 34 to the base 25b, as before. The circuit of FIG. 10 therefore has only a single feedback to the transistor 25, rather than the dual feedback of FIG. 9. It therefore tends to operate with a slower rise time and the wave form of its square wave is not quite as good as that of FIG. 9.

*FIG. 11*

This figure illustrates another modification of the oscillator circuit of FIG. 9, in which the preliminary stage including transistor 25 is eliminated. In its place, a feedback coil 44 is coupled magnetically to the output coil 14. The feedback coil takes the place of the secondary winding 31a in the circuit of the push-pull stage of FIG. 9. The other elements in FIG. 11 are the same in structure and in function as their counterparts in FIG. 9 and have been given the same reference numerals.

The circuit of FIG. 11 is not quite as efficient as the circuit of FIG. 9, since the feedback energy has to be transferred through the magnetic circuit between windings 14 and 44, instead of being supplied by the battery 24 through transistor 25.

In order to oscillate, the feedback signal in the circuit of FIG. 11 from the oscillator output must be large enough to sustain the oscillation. The oscillator of FIG. 9, on the other hand, is capable of providing the driver with energy varying at a frequency determined by the driver feedback when the feedback signal or counter current taken from the oscillator output is less than that needed for oscillation in a conventionally constructed oscillator. This advantage is gained by the use of the preliminary amplifier stage.

FIG. 12

This figure illustrates graphically the distribution of sound waves on a vertical plane taken through the fog horn 1. It may be seen that the sound is distributed horizontally substantially equally in all directions, and that the maximum sound intensity is in the horizontal direction. There are two minor lobes to the distribution pattern vertically above and below the fog horn. With the exception of these two minor lobes, the energy of the horn is expended where it will be most useful, i.e., in a horizontal direction. The two mouths of the double horn have been spaced apart vertically, so as to maximize the transmission of sound in the horizontal direction. The resulting directivity pattern is shown in FIG. 12. In this plot the sound pressure level measured at a radius of 25 feet is shown as a function of the polar angle. The sound pressure level is essentially independent of the azimuthal angle. The vertical spacing between the mouths of the horn in FIG. 1 was chosen to give a minimum of sound radiation at a polar angle of about 40°.

The effectiveness of a directive sound source such as the double fog horn is measured by the directivity index:

$$D.I. = 10 \log_{10} \frac{\text{sound intensity at a distance } r \text{ in the desired (horizontal) direction}}{4\pi r^2 \text{ times the average sound intensity}}$$

The theory for the sound radiation from two, small, in-phase sound sources shows that the D.I. reaches a maximum of about 4 db when the spacing between the sources is about 0.72 times the wavelength of sound. The center-to-center spacing of the mouths of the horn of FIG. 1 was chosen to be slightly less than 0.72 wavelengths; the smaller spacing giving a D.I. only slightly lower than 4 db and a somewhat broader main lobe (i.e., one having a greater vertical dimension) than would be the case for a spacing of 0.72 wavelengths. This broader main lobe is desirable in a device such as a fog horn, mounted close to the surface of the water and intended to produce signals audible on the bridges of ships which may have a considerably greater elevation than the fog horn.

While we have shown and described certain preferred embodiments of our invention, other modifications will readily occur to those skilled in the art, and we therefore intend our invention to be limited only by the appended claims.

We claim:
1. A fixed frequency audible signal apparatus, comprising:
   (a) a driver including
       (1) a wall vibratable to produce a sonic wave in fluid medium,
       (2) a coil, and
       (3) means supporting the coil and wall for concurrent vibratory movement;
   (b) said driver being mechanically resonant at said fixed frequency,
   (c) a magnetic circuit including
       (1) a magnet, and
       (2) an air gap in which the coil is received;
   (d) an electronic oscillator circuit having a resonant frequency when driving a resistive load equal to a major fraction of but less than said fixed frequency;
   (e) means coupling the output of the oscillator circuit to the coil; and
   (f) feedback means connecting the coil and the oscillator input to feed back signals effective to terminate the half-cycles in the oscillator and thereby to drive the oscillator at said fixed frequency.

2. A fixed frequency audible signal apparatus as defined in claim 1, including:
   (a) horn means having a substantially non-reactive acoustical impedance at said fixed frequency; and
   (b) means supporting said vibratable wall in operative relation to said horn means to vibrate a column of air therein.

3. A fixed frequency audible signal apparatus as defined in claim 2, in which said horn means including a double horn having one throat and two mouths and the horn forks between the throat and the mouths, said mouths having vertically spaced openings directed horizontally.

4. A fixed frequency audible signal apparatus as defined in claim 2, in which said horn has a mouth smaller than the minimum size required for non-reactive acoustic impedance at the fixed frequency and is therefore reactive, and balancing reactance means including an acoustic coupling device between the wall and the throat and dimensioned to provide a balancing reactance upon the movable wall of the driver, so that the mechanical load on the wall is effectively non-reactive at said fixed frequency.

5. Audible signal apparatus, comprising a generally cylindrical housing having its cylinder axis vertical, a double horn within the housing and having two vertically spaced upper and lower mouths with equal vertical dimensions, said mouths opening horizontally and extending around the periphery of the housing, said horn including a single throat, a fork, and a first tapered horn portion between the throat and the fork, and second and third tapered horn portions between the fork and the respective upper and lower mouths, said fork being located midway between the mouths and substantially along the axis of the housing, said second and third portions extending respectively upwardly and downwardly from the fork and curving to horizontal directions at the respective mouths, said first portion extending horizontally from the fork and curving toward a generally axial direction at the throat and extending through one of said second and third portions of the horn, an acoustic coupling device extending between the throat and an end portion of the housing, a driver for said horn located within said housing end portion and including a movable wall in a chamber constituting a portion of said acoustic coupling device, means including an electromagnetic coil for vibrating said wall, an oscillator for supplying current to said coil, and means supporting the oscillator within said end portion of the housing.

6. Audible signal apparatus for use in locations exposed to precipitation and spray, comprising a generally cylindrical housing having its cylinder axis vertical, a double horn within the housing and having two vertically spaced upper and lower mouths with equal vertical dimensions, said mouths opening horizontally and extending around the periphery of the housing, said horn including a single throat, a fork, and a first tapered horn portion between the throat and the fork, and second and third tapered horn portions extending between the fork and the respective upper and lower mouths, said horn portions being curved, said fork being located midway between the mouths and substantially along the axis of the housing, said second and third portions extending respectively upwardly and downwardly from the fork and curving to be tangent to the horizontal at the respective mouths, said second and third portions providing a drain for water entering either mouth to discharge through the lower mouth, said first portion extending horizontally from the fork and curving toward a generally upward direction at the throat, said first portion providing a drain for any water therein through the first horn portion and thence through the third horn portion and out the lower mout, a driver for said horn located within an upper end portion of the housing and including a movable wall in a chamber, an acoustic coupling device extending between the throat and the chamber, means including an electromagnetic coil for vibrating said wall, an oscillator for supplying current to said coil, and means supporting the oscillator within said end portion of the housing.

7. Audible signal apparatus as defined in claim 6, including a sealed chamber enclosing said coil and including a seal around the periphery of the movable wall, a container with desiccant therein, means supporting the container with an opening thereof in communication with the interior of the sealed chamber.

8. A driver for producing sound waves in response to an electric signal, comprising an elongated beam; supports at the ends of the beam, each support comprising a leaf spring extending in a plane perpendicular to the beam axis, means attaching one end of the spring to a fixed support, means attaching the other end of the spring to the beam; a coil, a movable wall, means mounting the coil and the wall on the beam midway between the supports for concurrent vibratory movement with the middle portion of the beam at a predetermined natural frequency, a magnet, a magnetic circuit including said magnet and having a gap, said supports and said mounting means cooperating to position the coil in the gap, an electronic oscillator circuit having a resonant frequency when driving a resistive load, which resonant frequency is equal to a major fraction of, but less than, said natural frequency, feedback means connecting the coil and oscillator input to feed back signals effective to terminate the half-cycles in the oscillator and thereby to drive the oscillator at said natural frequency, and means including the wall defining an air chamber in which sound waves are produced.

9. A driver as defined in claim 8, including a cylinder, said movable wall being a piston movable in the cylinder.

10. A driver as defined in claim 8, in which said air chamber defining means includes a cylinder member, said movable wall being a piston member movable in the cylinder member, one of the members having a peripheral groove, an O-ring seal received in the groove and compressed between and sealingly engaging the members, said groove having a dimension in the direction of relative motion of the members substantially greater than the O-ring diameter, so that the O-ring may roll between the members during relative movement thereof.

11. A fixed frequency audible signal apparatus as defined in claim 1, in which said feedback means comprises a second coil electromagnetically linked with said first-mentioned coil.

12. A fixed frequency audible signal apparatus as defined in claim 1, in which said oscillator circuit comprises a push-pull stage including two transistors having emitter, base and collector electrodes, means connecting the collector electrodes to the terminals of the coil, input winding means, means connecting the emitters together, and means connecting the input winding means between the emitters and the base electrodes.

References Cited in the file of this patent
UNITED STATES PATENTS

| | | |
|---|---|---|
| 1,204,304 | Moyer | Nov. 7, 1916 |
| 1,267,418 | Kaisling | May 28, 1918 |
| 1,299,201 | McCurtry | Apr. 1, 1919 |
| 1,451,495 | Dinsmoor | Apr. 10, 1923 |
| 1,939,347 | Greiner | Dec. 12, 1933 |
| 2,455,472 | Curl et al. | Dec. 7, 1948 |
| 2,790,164 | Oberg | Apr. 23, 1957 |
| 2,854,582 | Guyton | Sept. 30, 1958 |
| 2,883,539 | Bruck | Apr. 21, 1959 |
| 2,910,689 | Grace | Oct. 27, 1959 |
| 2,977,418 | Haas | Mar. 8, 1961 |

FOREIGN PATENTS

| | | |
|---|---|---|
| 696,741 | Great Britain | Sept. 9, 1953 |

UNITED STATES PATENT OFFICE
CERTIFICATE OF CORRECTION

Patent No. 3,138,795                                       June 23, 1964

Charles F. Wallace et al.

It is hereby certified that error appears in the above numbered patent requiring correction and that the said Letters Patent should read as corrected below.

Column 3, line 57, for "2d'" read -- 2d --; same line, for "2d" read -- 2d' --; column 7, line 73, for "perform" read -- performs --; column 10, line 21, for "including" read -- includes --; column 11, line 9, for "mout" read -- mouth --; column 12, lines 1 and 2, strike out "9. A driver as defined in claim 8, including a cylinder, said movable wall being a piston movable in the cylinder." line 3, for "10." read -- 9. --; line 13, for "11." read -- 10. --; line 17, for "12." read -- 11. --; same column 12, line 30, for "McCurtry" read -- McMurtry --; in the heading to the printed specification, line 8, for "12 Claims." read -- 11 Claims. --.

Signed and sealed this 1st day of December 1964.

(SEAL)
Attest:

ERNEST W. SWIDER                                EDWARD J. BRENNER
Attesting Officer                                 Commissioner of Patents